(12) United States Patent
Yamamoto et al.

(10) Patent No.: US 7,290,137 B2
(45) Date of Patent: Oct. 30, 2007

(54) INFORMATION PROCESSING APPARATUS, EXECUTABLE MODULE GENERATING METHOD, AND STORAGE MEDIUM

(75) Inventors: Hiroshi Yamamoto, Tokyo (JP); Toshimitsu Ohdaira, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 717 days.

(21) Appl. No.: 09/928,907

(22) Filed: Aug. 13, 2001

(65) Prior Publication Data
US 2002/0032868 A1 Mar. 14, 2002

(30) Foreign Application Priority Data
Aug. 15, 2000 (JP) ............................. 2000-246404
Jul. 25, 2001 (JP) ............................. 2001-224250

(51) Int. Cl.
*H04L 9/00* (2006.01)
*H04N 7/167* (2006.01)
*G06F 11/00* (2006.01)
*G06F 9/06* (2006.01)
*G06F 12/14* (2006.01)
*G06F 11/28* (2006.01)
*G06F 9/45* (2006.01)
*G09C 1/00* (2006.01)

(52) U.S. Cl. ...................... 713/167; 713/168; 380/44; 380/201

(58) Field of Classification Search ............... 713/164, 713/165, 166, 167, 150, 201, 168; 380/201, 380/44
See application file for complete search history.

(56) References Cited

U.S. PATENT DOCUMENTS 6,052,780 A * 4/2000 Glover ...................... 713/150
6,067,626 A * 5/2000 Watanabe ................... 713/310

FOREIGN PATENT DOCUMENTS

| EP | 0 770 957 | 5/1997 |
| EP | 0 926 595 | 6/1999 |
| JP | 58-186843 | 10/1983 |
| JP | 62-3460 | 1/1987 |
| JP | 63311455 | 12/1988 |
| JP | 4-268924 | 9/1992 |
| JP | 9305436 | 11/1997 |
| JP | 2005204134 A * | 7/2005 |
| WO | WO 99/05600 | 2/1999 |

OTHER PUBLICATIONS

Joris Claessens, Bart Preneel, and Joos Vandewlle, How can mobile agents do secure electronic transactions on untrusted hosts?, ACM Transactions on Internet Technology, vol. 3, Issue 1, Feb. 2003, pp. 28-48.*

David Aucsmith et al. Protect for the Software from reverse analysis and change. Nikkei Electronics, No. 706, Nikkei BP Jan. 5, 1998, pp. 209-220.

European Search Report dated Oct. 27, 2005 for corresponding EP Application 01119450.3.

* cited by examiner

*Primary Examiner*—Matthew Smithers
*Assistant Examiner*—Courtney D. Fields
(74) *Attorney, Agent, or Firm*—Katten Muchin Rosenman LLP

(57) ABSTRACT

In order to protect against unauthorized duplication of a library file, or the like, according to the present invention, an executable module is generated. The executable module is generated by generating, with decryption of an encrypted protective object, a protective object containing a procedure for terminating a process operation due to invalid relationship between a first protect code and a second protect code contained in the executable module, linking the resultant decrypted protective object with other object, and writing a protect code. Then, the decrypted protective object is deleted after linking with the other object.

35 Claims, 10 Drawing Sheets

INFORMATION PROCESSING APPARATUS, EXECUTABLE MODULE GENERATING METHOD, AND STORAGE MEDIUM

BACKGROUND OF THE INVENTION

As a technique capable of preventing an unauthorized duplication of a program, Japanese Patent No. 2569564 discloses a copy protect apparatus of the software. In this copy protect apparatus, since a protect code read out from a floppy disk is not outputted from this copy protect apparatus, it is possible to prohibit an illegal rewriting operation of the software. As a result, it is practically difficult to realize such an operation that the software duplicated in the illegal manner is executable. Thus, the unauthorized duplication of the software can be effectively prevented.

Normally, when a program is developed, a resource such as a library is used which may provide a graphic function and other basic functions. Objects contained in such a resource as a library and the like are not equal to executable modules (load modules). As a result, it is practically difficult to protect against an unauthorized duplication of such a library. As a consequence, software manufacturers provide resources such as libraries to which no copy protection is applied at present stages, while the software manufacturers should necessarily believe good sense of program development persons.

SUMMARY OF THE INVENTION

Since resources such as libraries may constitute very important development results similar to programs, it is strongly desirable to provide a certain sort of protection against unauthorized duplication of these resources. Therefore, in order to avoid an unauthorized duplication of an object other than an executable module, such an information processing apparatus may be provided. That is, an information processing apparatus, according to the present invention, is featured by comprising:

storage means for storing thereinto an encrypted protective object including a procedure capable of terminating a process due to a invalidity of a protect code contained in an executable module;

decrypting means for reading the encrypted protective object from the storage means and decrypting the encrypted protective object;

code writing means for incorporating the protect code into an executable module generated by linking the decrypted protective object with another object; and deleting means for deleting the decrypted protective object after the decrypted protective object has been linked with the another object.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENTS

Referring now to the accompanying drawings, a preferred embodiment of the present invention will be described in detail. Herein, it should be understood that a library is handled as an object to be protect (namely, protective object) in this specification.

Figure 1:
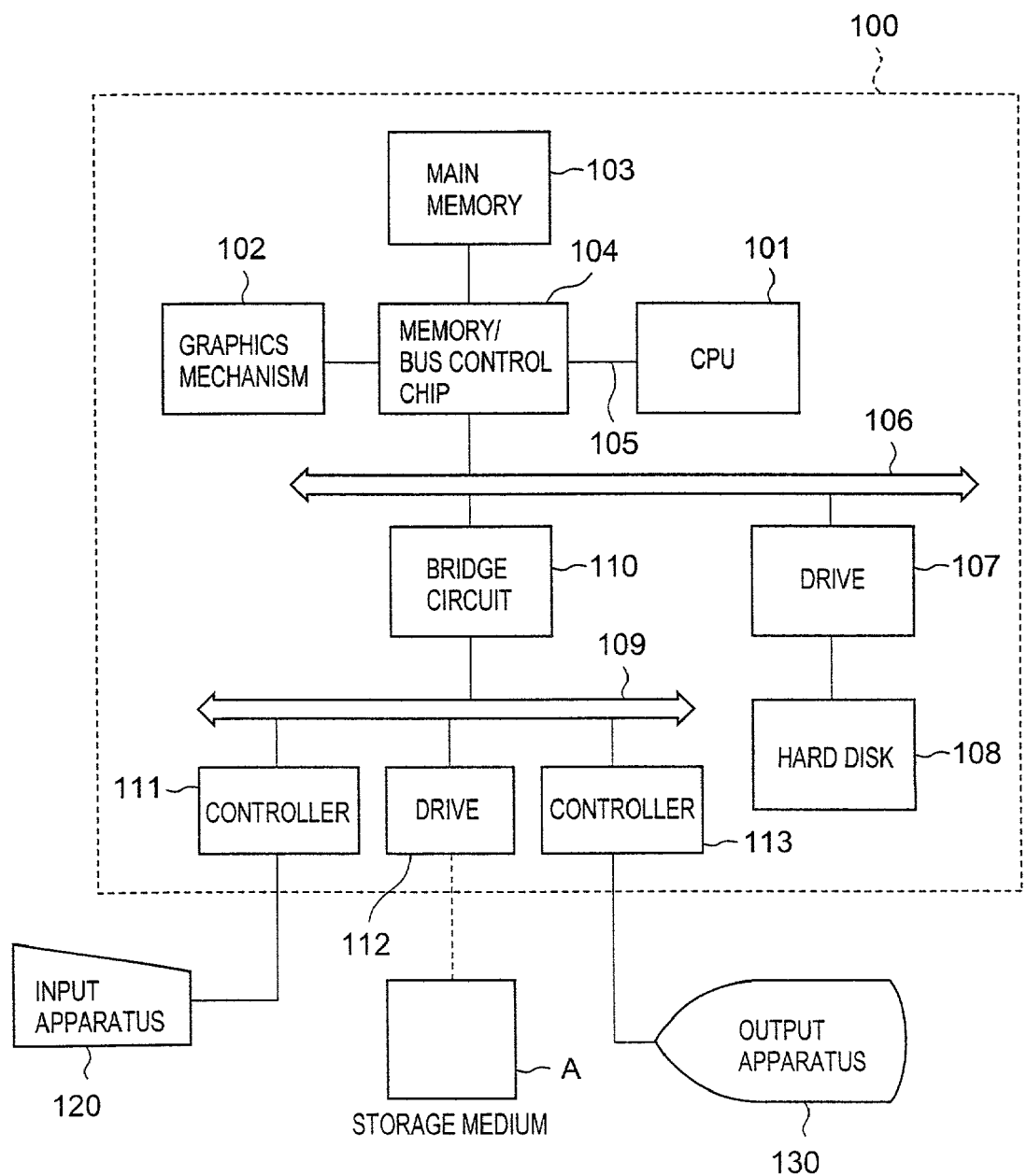
FIG. 1 schematically shows a hardware configuration of an information processing system according to an embodiment mode of the present invention.

First, referring to FIG. 1, a description will now be made of a hardware structure of an information processing system, according to an embodiment mode of the present invention, which is used on the program developing side.

The information processing system used on the program developing side is arranged by an information processing apparatus 100, an input apparatus 120 (for example, a mouse, a keyboard) capable of accepting data inputted from a user (namely, a program developing person), an output apparatus 130 (display device etc.) for outputting various sorts of data, and the like. Furthermore, this information processing system may be arranged by additionally employing other apparatus, if needed.

The information processing apparatus 100 is equipped with a CPU 101, a graphics mechanism 102, a main memory 103, a memory/bus control chip 104, a processor bus 105, a high-speed bus 106, a hard disk drive 107, a hard disk 108, a low-speed bus 109, a bridge circuit 110, a controller 111, a drive 112, AGP, and another controller 113, and also a communication port (serial port, parallel port). The CPU 101 executes a process operation used to generate an executable program file (will be explained later). The graphics mechanism 102 executes a graphic drawing process operation. The memory/bus control chip 104 controls a data transfer operation executed between the CPU 101, or the like, and either the main memory 103 or the high-speed bus 106. The processor bus 105 is connected between the CPU 101 and the main memory 103. The high-speed bus 106 is connected to the hard disk drive 107. The hard disk drive 107 executes data reading/writing process operations with respect to the hard disk 108. The AGP is connected between a graphics control chip of the graphics mechanism 102 and the memory/bus control chip 104. The hard disk 108 is used to store various sorts of data required to develop software.

These data correspond to a front-end tool into which identification information such as a serial number is embedded, a linker and a compiler which are initiated by the front-end tool, an encrypted library file provided in connection with the front-end tool, and the like. The low-speed bus 109 is used to connect the respective controllers 111 and 113 to the drive 112. The bridge circuit 110 is connected between the high-speed bus 106 and the low-speed bus 109. The controller 111 controls a data transfer operation from the input apparatus 120. The controller 113 controls a data transfer operation to the output apparatus 130. It should also be understood that the internal arrangements of the information processing apparatus 100 shown in this drawing are merely employed as one example used in the software developing work.

Next, the various data stored in the hard disk 108 employed in this information processing system will now be explained.

A compiler corresponds to software, which defines such a process operation that this software causes the CPU to translate a designated source program into an object program by way of an analysis process operation (lexical analysis, syntax analysis, semantic analysis), and then this software causes this object program to be stored in an object file. A linker corresponds to software which defines such a process operation that this software causes the CPU links object program described in a designated object file with any library routine or other code so as to generate an executable module, and then, this software causes this executable module to be stored in an executable program file. Then, a front-end tool, according to this embodiment mode, corresponds to software which is defined by such a process operation that this software causes the CPU to initiate both a compiler and a linker so as to execute a process operation used to generate an executable program file (will be discussed later).

An encrypted library file "$L_1$" (will be referred to an "encrypted Lib file $L_1$" hereinafter) is provided to a user (program developing person) together with the front-end tool. For instance, both an installing CD-ROM on which the encrypted Lib file $L_1$ has been recorded, and an installing floppy disk on which the front-end tool has been recorded are supplied as one set to the user.

This encrypted Lib file $L_1$ is formed by encrypting one, or more library files "$L_2$" (will be referred to an "Lib file $L_2$" hereinafter) by way of a proper encrypting process operation. When the user forms the executable program file, the user decrypts this encrypted Lib file $L_1$ by way of the front-end tool, so that one, or more Lib files $L_2$ can be obtained which are required to generate the executable program. As explained above, while the library file is provided under encrypted state, this encrypted library file is decrypted by using the front-end tool which is provided in connection with this encrypted library file. This is because an unauthorized use of such a Lib file by any users who do not own this front-end tool is prohibited.

Into the Lib file $L_2$ which is produced by decrypting the encrypted Lib file $L_1$, library routines such as basic functions are stored in the form of components, while these basic functions are used in application software such as a graphic function and an event process operation. Library routine contained in the Lib file $L_2$, which contains initialization function called in all of application programs, furthermore contains both a protect code check procedure called in an initialization function, and a first protect code storage variable. A first protect code $C_1$ is stored into this first protect code storage variable before the Lib file $L_2$ and an object file $M_2$ are linked. In this case, the below-mentioned procedure is defined in the above-explained protect code check procedure. That is, this procedure checks as to whether or not both data stored in the first protect code storage variable and data stored in a tail portion of a program file can satisfy such a relationship which can be satisfied only by the valid protect codes $C_1$ and $C_2$. When these data cannot satisfy this relationship, the protect code check procedure may terminate a program under execution at an initialization stage.

It should also be noted that in this embodiment mode, both the protect code check function and the first protect code storage variable are contained only in the Lib file $L_2$ into which the initialization function is involved. Alternatively, both the protect code check function and the first protect storage variable may be contained in all of the Lib files. Further, both the protect code check function and the first protect storage variable may be contained only in a representative Lib file, for example, only such a Lib file which should be protected.

Since the information processing system according to this embodiment mode is provided with such a hardware arrangement and the hard-disk-stored data (namely, software such as front-end tool, compiler, and linker, and encrypted library file), a functional structure of this information processing system (see FIG. 2) may be realized. Concretely speaking, the following functional units (1) to (11) may be realized: (1) an input accepting unit 200 for accepting an input of an initiating command of the front-end tool; (2) a startup check processing unit 201 for executing a front-end tool duplication check process when the front-end tool is initiated; (3) a development result storage unit 202 for storing thereinto a development result (namely, source program file $M_1$, object file $M_2$, and executable program file $M_3$); (4) a compile processing unit 203 for producing the object file $M_2$ from the source program file $M_1$; (5) a library storage unit 204 for storing thereinto the encrypted Lib file $L_1$; (6) a decrypting process unit 205 for decrypting the encrypted Lib file $L_1$; (7) a temporary file storage unit (tmp) 206 for storing thereinto the Lib file produced by the decrypting process of the decrypting process unit 204 as a temporary file $L_2$; (8) a link processing unit 207 for linking the Lib file $L_2$ with the object file $M_2$ so as to generate the executable program file $M_3$; (9) a temporary file deleting process unit 208 for deleting the temporary file $L_2$ after performing the coupling/editing process operations by the link processing unit 207; (10) a code applying process unit 209 for applying the protect codes $C_1$ and $C_2$ to the Lib file $L_2$ obtained before performing the coupling/editing process operation by the link processing unit 207, and also the executable program file $M_3$ which is formed from this Lib file $L_2$; and (11) a control processing unit 210 for controlling these processing units (1) to (10).

In this case, the code applying process unit 209 includes (12) a code generating process unit 209a, and (13) a code writing process unit 209b. The code generating process unit 209a generates one set of mutually-related protect codes $C_1$ and $C_2$, for example, one set of such protect codes $C_1$ and $C_2$ capable of satisfying a relationship of $C_1=f(C_2)$. The code writing process unit 209b writes one code "$C_1$" (called as "first protect code") selected from one set of first and second the protect codes $C_1$ and $C_2$ generated from the code generating process unit 209a, and also adds the other code $C_2$ (called as "second protect code") to the tail portion of the executable program file $M_3$.

Next, a description will now be made of a process operation for generating an executable program file executed by the above-described functional structure units.

A program development person stores a source program file "M$_1$" into a pre-selected storage area (corresponding to development result storage unit 202 of FIG. 2) of the hard disk 108 after the coding operation is accomplished, and thereafter, initiates the front-end tool by designating both a name of this source program and a name of a necessary library file. As a result, the CPU executes a process operation which is defined in the front end tool, so that the below-mentioned executable program file generating process operation (see flow chart of FIG. 3) may be realized.

That is, first, the input accepting unit 200 which has accepted the initiation command of the front-end tool instructs the control processing unit 210 to commence the process operation (step S300). Upon receipt this instruction, the control processing unit 210 instructs the initiating time check processing unit 201 to execute the front-end tool duplication check processing operation. The initiating time check processing unit 201 checks an unauthorized use of this front-end tool by using the below-mentioned method in response to this instruction (step S301).

For instance, in the case that a LAN (local area network) is established in a program development environment and such a check program resides on the network, and also, this check program monitors as to whether or not identification information of programs operated on the network is not overlapped with each other, the initiating time checking process unit 201 transmits the identification information applied to the front-end tool to this network. In response to this transmitted identification information, the check program sends an answer for informing as to whether or not the same identification information is present on the network. If this front-end tool corresponds to a so-called "copied product", then plural pieces of the same identification information is present on the network, whereas if this front-end tool does not correspond to such a copied product, then plural pieces of the same identification information is not present on the network. As a consequence, the check program can check such an unauthorized use of the front-end tool.

Also, in the case that a dongle is allocated to the front-end tool, the initiating time check processing unit 201 sends an authorization message to a dongle which is applied to a communication port of an information processing apparatus. In response to this sent message, the dongle returns identification information which is assigned to the own dongle. In the case that the authorized user initiates the front-end tool, the identification returned from the dongle is made coincident with the identification information of the front-end tool. In the case that a user except for the authorized user initiates the front-end tool, no identification information is returned since the dongle is not mounted thereto, or the identification information returned from the dongle is not made coincident with the identification information of the front-end tool. Therefore, it is possible to check such an unauthorized use of the front-end tool.

Based upon such a check result, the initiating time check processing unit 201 decides whether or not the front-end tool is used in such an unauthorized manner (for example, front-end tool is a duplicated front-end tool, and front-end tool is used by user other than authorized user) at a step S302.

As a result, in such a case that the initiating time check processing unit 201 decides the unauthorized use of the front-end tool, the control processing unit 210 outputs an error message (step S303), and thereafter, terminates this process operation (step S308). As a consequence, since the unauthorized use of the front-end tool is prohibited, the user who uses the front-end tool in the unauthorized manner can hardly decrypt, or decode the encrypted Lib file L$_1$. As a consequence, the unauthorized use of the Lib file L$_2$ can also be prohibited.

On the other hand, in the case that the initiating time check processing unit 201 decides that the front-end tool is not used in the unauthorized manner, the control processing unit 210 instructs the compile processing unit 203 to perform a machine language translation of a designated source program film M$_1$. In response to this instruction, the compile processing unit 203 compiles this designated source program file M$_1$ into an assembly program, and then, assembles this assembly program into an object program. Thereafter, the compile processing unit 203 stores the object file M$_2$ produced at this time into the development result storage unit 202, and thereafter, notifies the normal end to the control process unit 210.

When the control process unit 210 accepts the notification of the normal end from the compile processing unit 203, this control processing unit 210 instructs the decrypting process unit 205 to decrypt the encrypted Lib file L$_1$. The decrypting process unit 205 loads the encrypted Lib file L$_1$ from the library storage unit 204 in response to this instruction, and then, decrypts this encrypted Lid file L$_1$. When one, or more Lib files L$_2$ are produced in accordance with the above-described manner, the decrypting unit 205 stores this Lib file L$_2$ into the temporary file storage unit 206 as such a temporary file having a proper file name, and then, notifies the normal end to the control processing unit 210.

Figure 4:
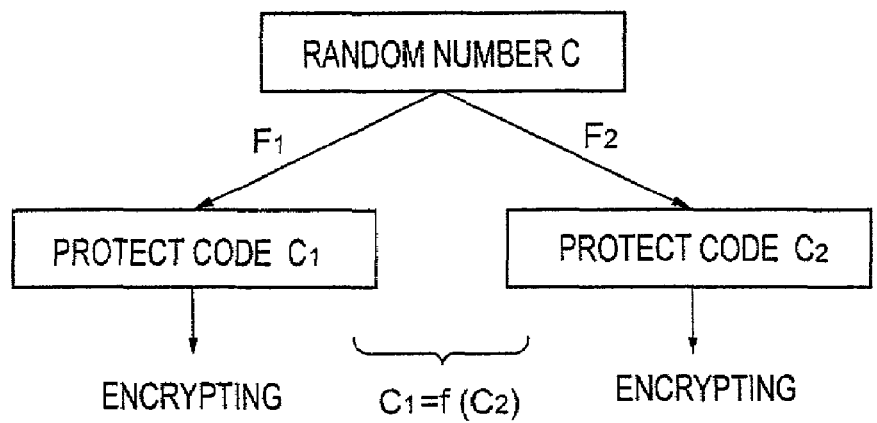
FIG. 4 is a conceptional diagram indicating a method of producing one set of protect codes according to the embodiment mode of the present invention.

When the control process unit 210 accepts the normal end notification from the decrypting process unit 205, this control process unit 210 instructs the code applying process unit 209 to apply a protect code with respect to the Lib file L$_2$. In response to this instruction, the code applying process unit 209 performs the following process operations. That is, first of all, as represented in FIG. 4, the code generating process unit 209a generates a random number "C", and then, processes this random number "C" by way of two processing methods "F$_1$" and "F$_2$" (for example, two functions using random number C as input data), so that two first and second protect codes C$_1$ and C$_2$ are produced. As previously explained, a predetermined relationship (in this case, it is so assumed that C$_1$=f (C$_2$)) is established in these first and second protect codes C$_1$ and C$_2$ which are generated in this code generating process unit 209a. These protect codes C$_1$ and C$_2$ are furthermore encrypted by the code generating process unit 209a, while utilizing a proper encrypting method. In addition, the code writing process unit 209b saves the second protect codes C$_2$, and also stores the first protect code C$_1$ into the first protect code storage variable contained a predetermined Lib file L$_2$ (step S304).

When the protect code application with respect to the Lib file L$_2$ is completed in the above-described manner, the control process unit 210 instructs the link processing unit 207 to link both the object file M$_2$ with the designated Lib file L$_3$. Then, the link processing unit 207 links the object file M$_2$ with the designated Lib file L$_2$ in response to this instruction, and then, embeds thereinto an actual address. As a result, when the executable program file M$_3$ is generated, the link processing unit 207 stores this executable program file M$_3$ into the development result storage unit 202 with applying a proper name to this program file M$_3$, and thereafter, notifies the normal end to the control process unit 210 (step S305).

In the case that the control processing unit 210 accepts the normal end notification from the link processing unit 207, this control process unit 210 instructs the temporary file deleting process unit 208 to temporarily delete the file. In response to this instruction, the temporary file deleting process unit 208 deletes all of the Lib files $L_2$ from the temporary file storage unit 206 (step S306).

Thereafter, the control process unit 210 instructs the code applying process unit 209 to apply a protect code with respect to the executable program file $M_3$. In response to this instruction, the code writing process unit 209b of the code applying process unit 209 applies the second protect code $C_2$ to the executable program file $M_3$, and thereafter, notifies the normal end to the control process unit 210 (step S307). It should also be understood that in order to manage licensees (for instance, identification of software house), the identification information of the front-end tool may be embedded into the executable-program file $M_3$ by the code applying process unit 209 at this time.

Upon receipt of the normal end notification from the code applying process unit 209, the control processing unit 210 completes this program generating process operation (step S308). It should also be noted that the executable program file $M_3$ which has been generated by executing the above-explained process operation may be stored in, for example, a storage medium such as an optical disk (see FIG. 9) so as to be supplied to a market.

Figure 2:
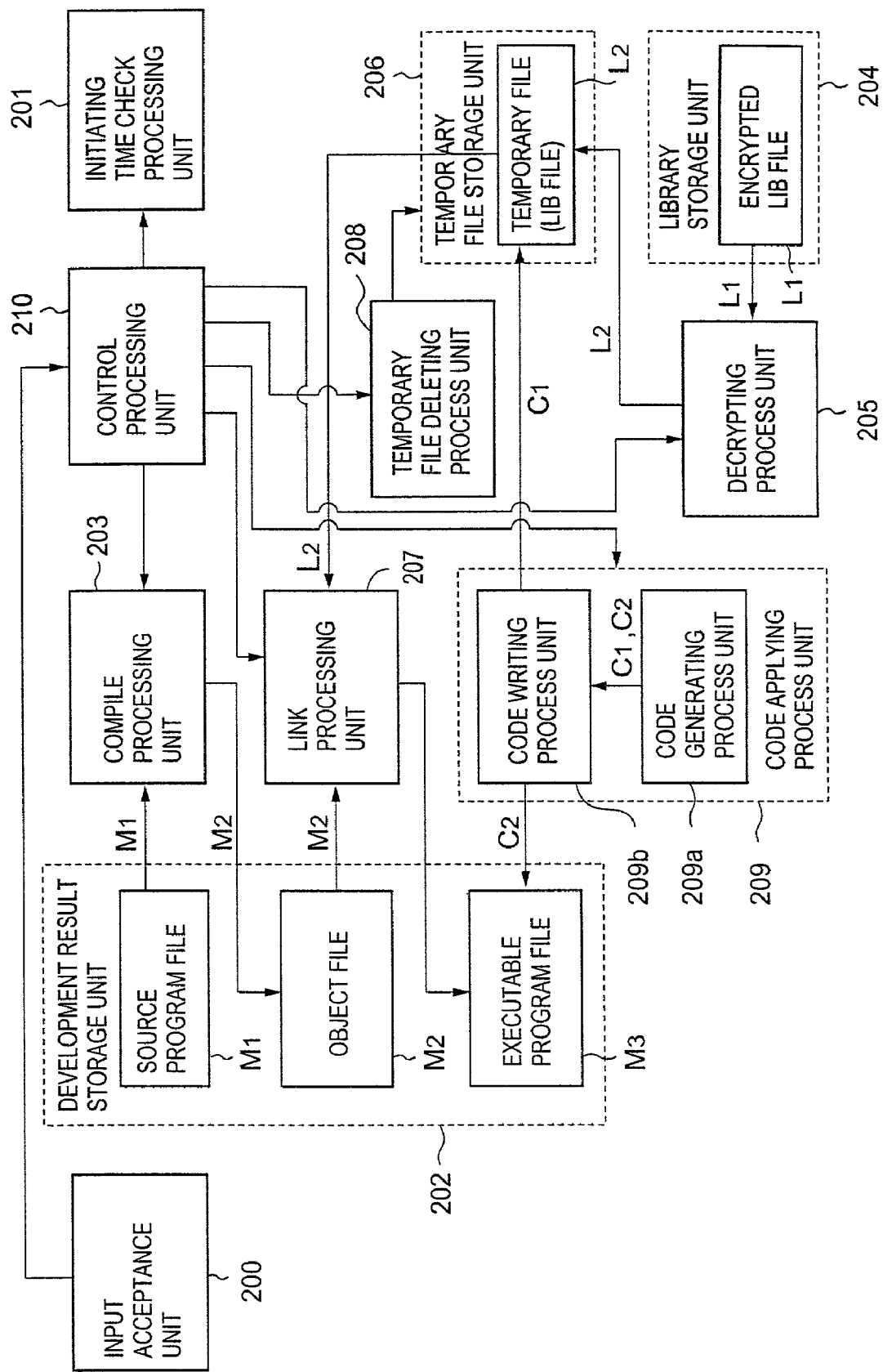
FIG. 2 is a functional structural diagram of an information processing system according to the embodiment mode of the present invention.
Figure 3:
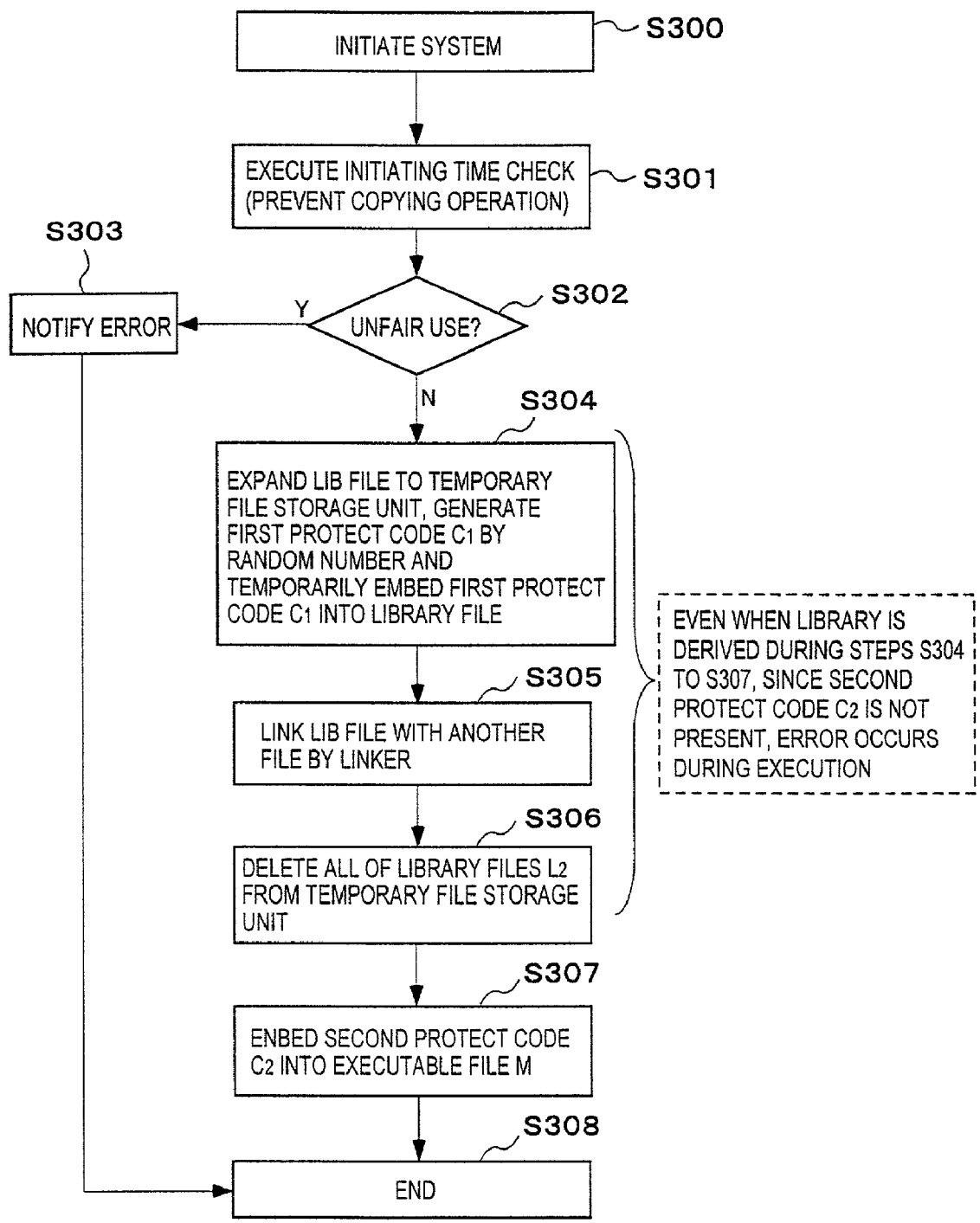
FIG. 3 is a flow chart for explaining a process operation for producing an executable program according to an embodiment mode of the present invention.

In accordance with the executable program file generating process operation according to this embodiment mode, the unauthorized use of the Lib file $L_2$ can be prevented, as explained in the below-mentioned items (1) to (4):

(1) The Lib file stored in the hard disk 108 is encrypted, and furthermore, the unauthorized use of the front-end tool capable of decrypting this encrypted Lib file is prohibited by executing the initiating time check operation defined at the step S301 of FIG. 2. As a result, it is possible to prevent the use of the Lib file by such a user except for the authorized user of this front-end tool.

Figure 5:
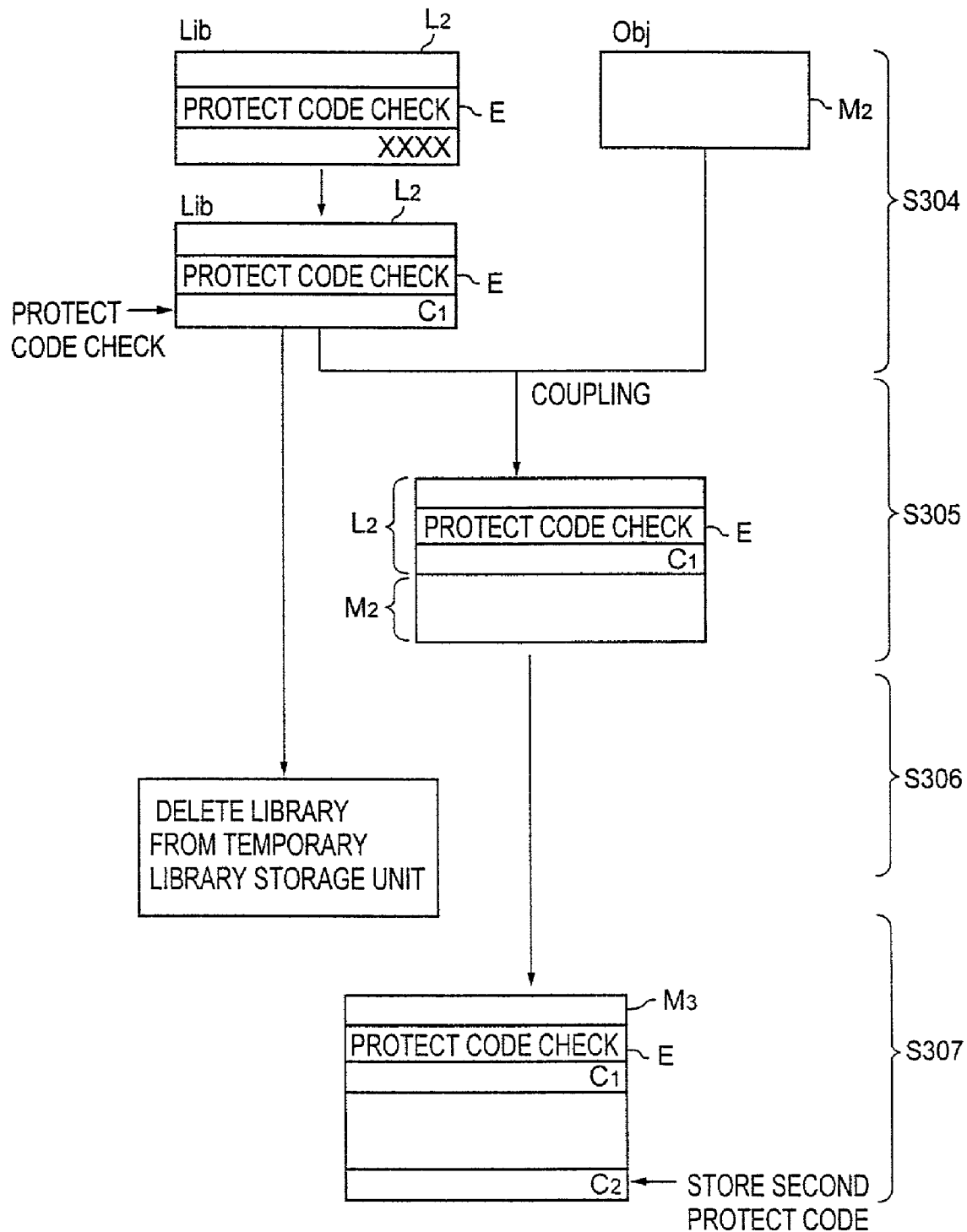
FIG. 5 is a conceptional drawing representing a process operation by which the executable program file according to the embodiment mode of the present invention is formed.

(2) As illustrated in FIG. 5, a protect code check procedure "E" is contained in the Lib file $L_2$ in advance. This protect code check procedure "E" is capable of terminating a process operation, in the case that invalid protect codes are embedded in a program file under execution. The proper first and second protect codes $C_1$ and $C_2$ are embedded only in the executable program file $M_3$ in the steps (S304 and S307) of the executable program file generating process operation. In this executable program file $M_3$, the Lib file $L_2$ is linked with the object file $M_2$ by using the front-end tool. As a consequence, only such an executable program file $M_3$ which has been generated by using the front-end tool in the authorized manner may be executed. In other words, the execution of such an executable program file generated by linking the Lib file with the object file without use of the front-end tool is prohibited at the initialization stage. Concretely speaking, the execution of an executable program file into which an invalid protect code (one, both protect codes) has been embedded, and also the execution of an executable program file into which a protect code (one, or both codes) has not yet been embedded are prohibited at the initialization stage. As a consequence, it is possible to prevent the use of the Lib file by such a user except for the authorized user of this front-end tool.

(3) As illustrated in FIG. 5, only the first protect code $C_1$ selected from one set of the first and second protect codes $C_1$ and $C_2$ which are produced from the random number C is embedded in the Lib file $L_2$ (step S304). Subsequently, after the linking operation of the Lib file $L_2$ with the object file $M_2$ (step S305) has been accomplished, the Lib file $L_2$ is deleted (step S306) before the second protect code $C_2$ is embedded into the executable program file $M_2$. As a consequence, the unauthorized reuse of the used Lib file $L_2$ can be prevented. In other words, even when such a used Lib file $L_2$ into which one protect code $C_1$ has been embedded can be obtained before being deleted, the other protect code $C_2$ generated from the random number C cannot be obtained at this stage (steps S304 to S306). As a consequence, it is practically difficult to know the second protect code $C_2$ which does not contradict the first protect code $C_1$ which has been embedded in this used Lib file $L_2$. As a result, even when the used Lib file $L_2$ which has been obtained before being deleted is linked with the object file, the second protect code having the proper relationship with the first protect code which has been embedded in the used Lib file $L_2$ can be hardly embedded in the executable program file. As a consequence, the unauthorized reuse of the used Lib file can be prevented.

(4) Even in such a case that the completed executable program file $M_3$ is analyzed to recognize one set of the first and second protect codes $C_1$ and $C_2$ which have been embedded into this executable program file $M_3$ and thereafter the used Lib file $L_2$ is obtained before being deleted when the front-end tool is next initiated, since both the first and second protect codes $C_1$ and $C_2$ are produced from the random number every time, the second protect code $C_2$ corresponding to the first protect code $C_1$ which is embed in the used Lib file $L_2$ which has been obtained before being deleted is not always made coincident with the second protect code $C_2$ recognized by analyzing the executable program file $M_3$. As a result, even when the completed executable program file $M_3$ is analyzed, it is practically difficult to acquire one set of such protect codes having a proper relationship. As a result, even when the used Lib file $L_2$ which has been obtained before being deleted is linked with the object file, the second protect code having the proper relationship with the first protect code which has been embedded in the used Lib file $L_2$ can be hardly embedded in the executable program file. As a consequence, the unauthorized reuse of the used Lib file can be prevented.

While the unauthorized use of the Lib file can be prevented by way of the above-explained four preventive measures, if both the encrypting method for the Lib file and the content of the protect code check procedure are changed respectively every time the version of the library is graded up, then the safeguard against the unauthorized use of the Lib file may be strengthened. In this alternative case, such a front-end tool that the Lib file decrypting method thereof and the random number generating method thereof have been changed must be released in connection with the encrypted Lib file having the new version.

Figure 6:
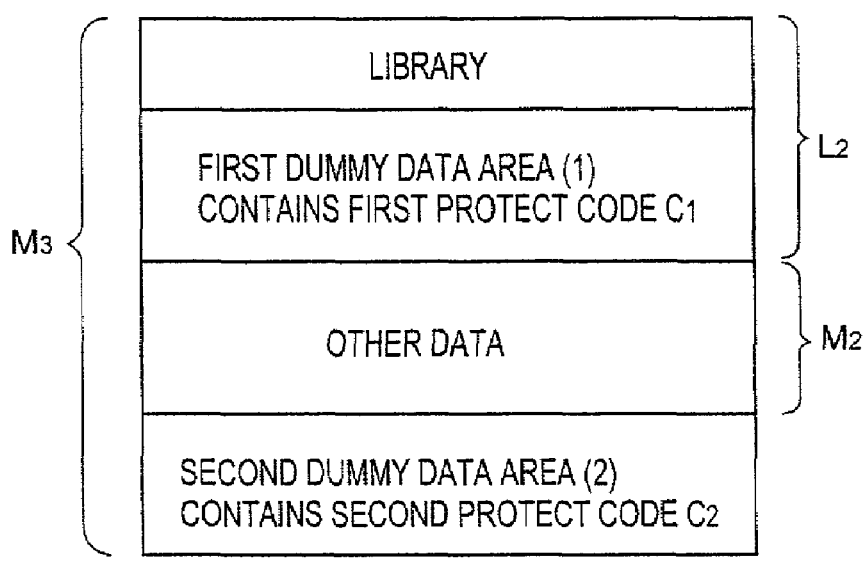
FIG. 6 is a conceptional diagram showing a data structure of the executable program file according to the embodiment mode of the present invention.

On the other hand, in the above-explained embodiment mode, the first protect code $C_1$ is stored in the first protect code storage variable defined within the Lib file $L_2$, whereas the second protect code $C_2$ is added to the tail portion of the executable program file $M_3$. However, the present invention is not limited to this method. Alternatively, for example, as illustrated in FIG. 6, the protect code applying process unit may add a first dummy data area ① containing both dummy data and the first protect code $C_1$ to the tail portion of the Lib file $L_2$, and also may add a second dummy data area ② containing both dummy data and the second protect code $C_2$ to the tail portion of the executable program file $M_3$. Then, if data amounts of the dummy data which are contained in the first and second dummy data areas ① and ② are changed at random in order not to exceed a total data amount of these two dummy areas ① and ②, then the addresses of the protect codes $C_1$ and $C_2$ contained in one executable program file $M_3$ are changed every time one executable program file $M_3$ is formed. As a consequence, this alternative method can give such a advantage that the analysis for the relationship between the protect codes $C_1$ and $C_2$ can be hardly carried out.

Further, in the above-explained embodiment mode, the first protect code is embedded, before linkage, into the Lib file in which the protect code check procedure has been assembled, the second protect code is furthermore embedded in the executable program file completed by linkage. However, the present invention is not limited to this method. Alternatively, for instance, while the protect code is not assembled in the Lib file into which the protect code check procedure has been assembled, at least protect code whose validity can be checked by the protect code check procedure may be embedded in the completed executable program file. As this protect code, for example, a plurality of protect codes which are mutually related may be employed.

Next, a description will now be made of a schematic hardware structure of such a system capable of executing the executable program file $M_3$ which is generated by the program file generating process operation according to this embodiment mode. It should be understood that an entertainment apparatus may be employed as one example of this system.

Figure 7:
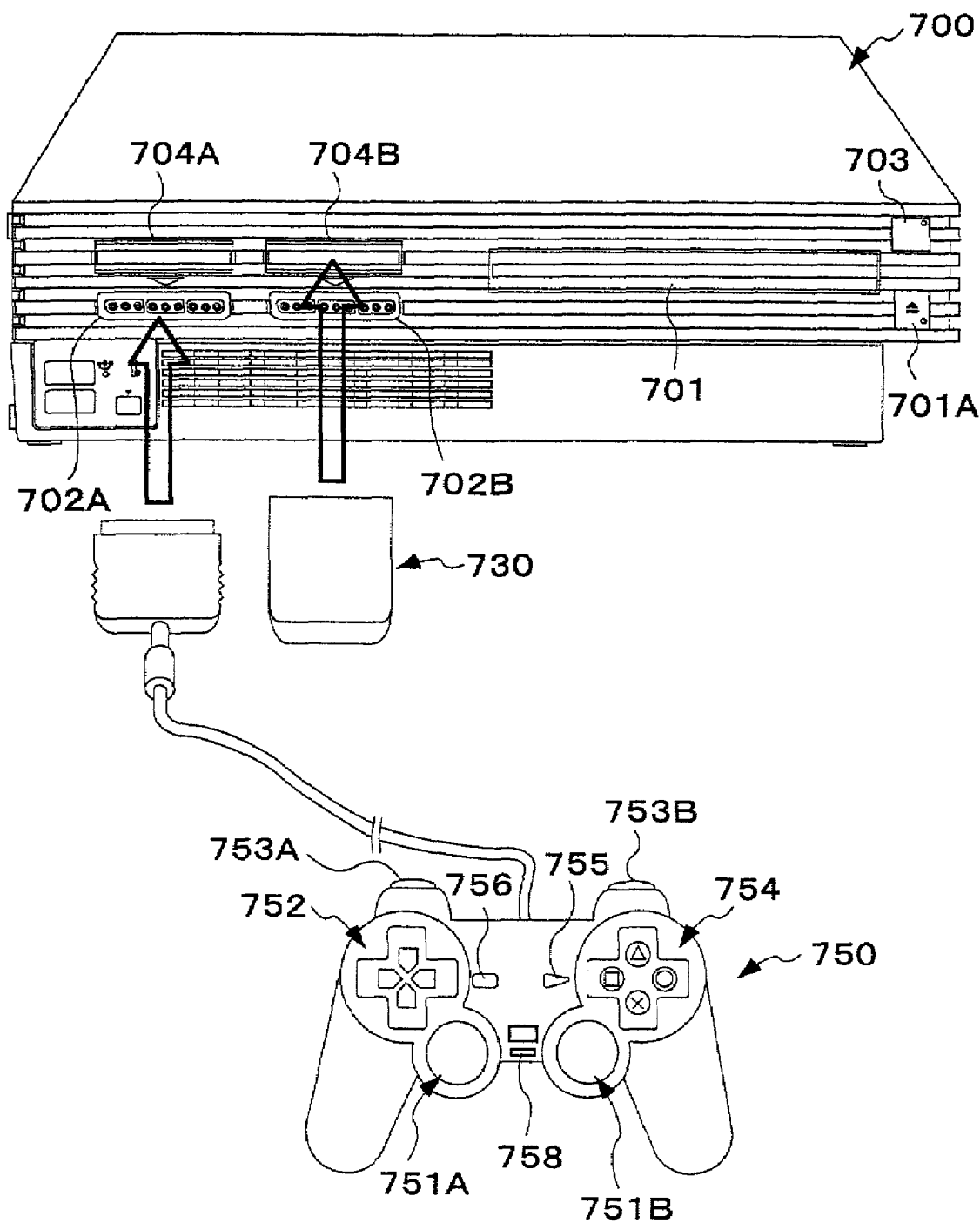
FIG. 7 shows an external view of an entertainment apparatus and an external view of a peripheral machine of this entertainment apparatus, according to an embodiment mode of the present invention.
Figure 8:
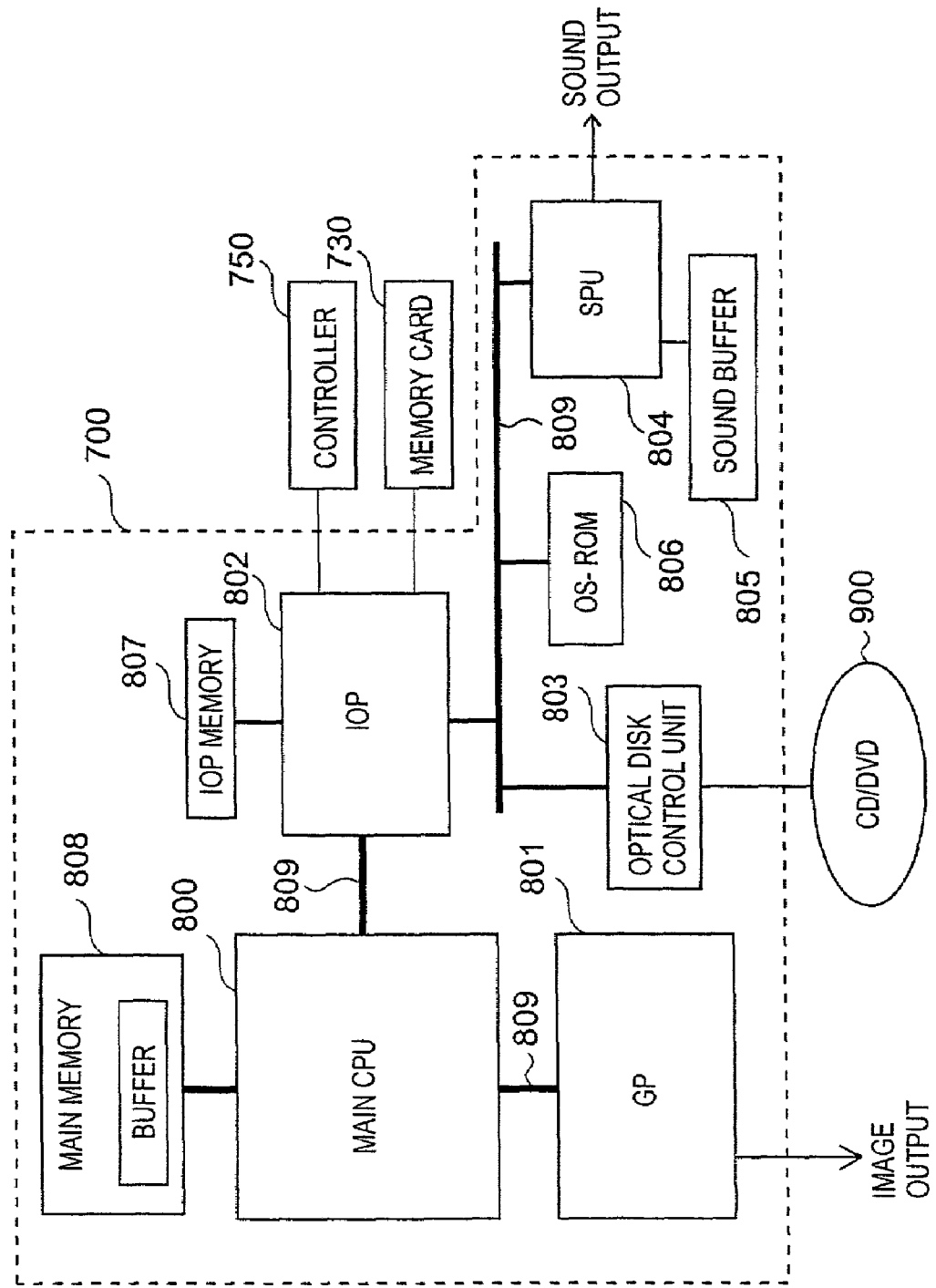
FIG. 8 schematically represents a hardware structure of the entertainment apparatus according to the embodiment mode of the present invention.

FIG. 7 is an external view of an entertainment apparatus 700 and another external view of a peripheral appliance thereof, according to an embodiment mode of the present invention. FIG. 8 shows a schematic view of hardware structure of the entertainment apparatus 700 according to this embodiment mode.

The entertainment apparatus 700, according to this embodiment mode, loads a game program (namely, executable program file $M_3$ generated by the above-explained program file generating process) from an optical disk 900 such as a CD-ROM and a DVD-ROM, and then, executes a game in accordance with this game program. In connection therewith, the expression "execution of game" implies that the entertainment apparatus 700 changes both a picture displayed on a display apparatus (CRT, LCD, image projection apparatus etc.) and sound produced from an audio apparatus in conjunction with a game story and the like in response to an instruction issued from a user (will be referred to as a "game player" hereinafter).

As indicated in FIG. 7, various sorts of operation units are provided on a front surface of a housing of the entertainment apparatus 700, and these operation units are required to execute the game by the game player. As a concrete example of such operation units, the following various units may be employed: A disk loading unit 701 on which an optical disk 900 for storing thereinto the game product is loaded; a tray operation button 701A used to pull out a tray from the disk loading unit 701; a plurality (for example, two sets) of controller connecting units 702A and 702B to which a controller 750 is connected; and a reset button 703 for resetting a game under execution; a plurality (for example, two sets) of memory card loading units 704A and 704B on which a memory card 730 may be mounted for recording thereon game data. The controller 750 owns various sorts of input accepting units (for instance, buttons 753A, 753B, 754 to 758, direction key 752, sticks 751A, 751B) which accept inputs made from the game player. The reason why a plurality of controller connecting units 702A and 703B are provided in this entertainment apparatus 700 is given as follows: Since controllers are connected to the respective controller connecting units 702A and 702B, the entertainment apparatus 700 may accept instructions issued from a plurality of game players.

Also, a power supply ON/OFF switch (not shown), and an AV terminal (not shown) to which the display apparatus is connected are provided on a rear surface (opposite side of front surface) of the housing of this entertainment apparatus 700.

As represented in FIG. 8, the below-mentioned electronic components/units are built into this entertainment apparatus 700: a main CPU 800 for controlling an entire system of this entertainment apparatus 700; a graphic processor (GP) 801 for generating a video signal to be outputted from the AV terminal (not shown); an I/O processor (IOP) 802 for controlling a data transfer operation between the controller 50 connected to the controller connecting units 702A/702B and the memory card 730 connected to the memory card connecting units 704A/704B; an optical disk control unit 803 for controlling data reading operation with respect to the optical disk 900 loaded on the disk loading unit 701; a sound reproducing processor (SPU) for generating an audio signal to be outputted from the AV terminal; a sound buffer 805; an OS-ROM 806 for previously storing thereinto operating systems (OS) which are executed by the above-explained main CPU 800 and IOP 802; an IOP memory 807 used as a work area of the IOP 802; a main memory 808 used as both a work area and a buffer with respect to the main CPU 800; and further, a bus 809 connected to these electronic components/units.

When the power supply of this entertainment apparatus 700 is turned ON, two sorts of operating systems (namely, OS for main CPU and OS for IOP) are loaded from the OS-ROM 806, and then, these operating systems are executed by the main CPU 800 and the IOP 802, respectively. As a result, the control of overall operation of units of the entertainment apparatus 700 by the operating system are started, so that the various sorts of functions available in this entertainment apparatus 700 may be provided to a game player. Concretely speaking, the below-mentioned environments may be provided to the game player. Under these environments, an executable program file may be loaded from the optical disk so as to be executed, an instruction issued from this game player via the controller may be accepted, and a picture (video) display and sound effect/mood music sound are produced in response to an instruction issued from this game player.

Figure 9:
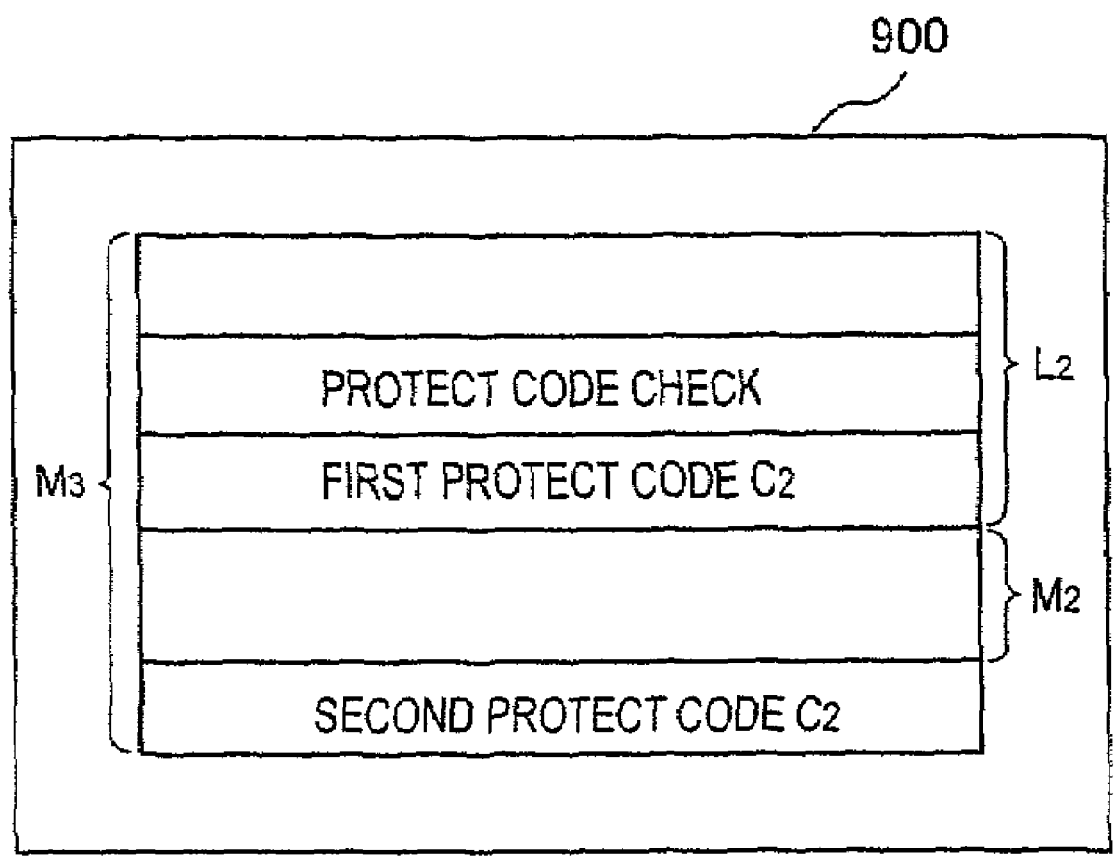
FIG. 9 is a conceptional diagram indicating a data structure of data stored in an optical disk according to an embodiment mode of the present invention.
Figure 10:
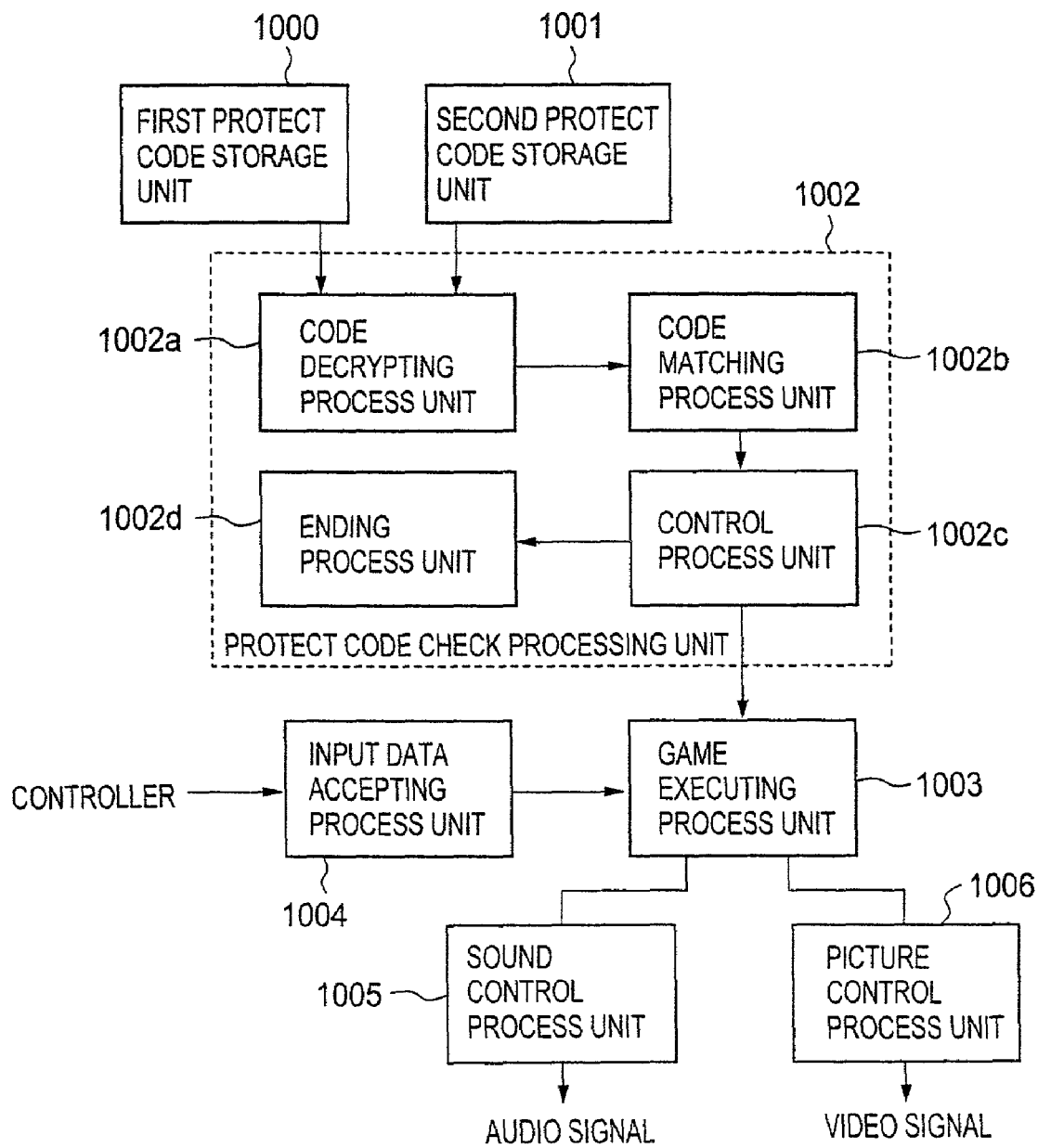
FIG. 10 shows a functional structural diagram of the entertainment apparatus according to the embodiment mode of the present invention.

Under such an environment, in such a case that the game executable program file $M_3$ is loaded out from the optical disk 900 shown in FIG. 9 and this game executable program file $M_3$ has been generated in accordance with the above-explained executable program file generating process operation, the functional structures used to execute the process operations defined in this game executable program $M_3$ may be realized as a process by the main CPU 800. In other words, as represented in FIG. 10, the entertainment apparatus 700 may realize the following units: a first protect code storage unit 1000 for storing thereinto data stored in a predetermined region (first program storage variable) of the game executable program file $M_3$ (when game executable program file $M_3$ is produced by using Lib file in authorized manner, this stored data corresponds to first authorized protect code $C_1$); a second protect code storage unit 1001 for storing thereinto data stored in a tail region of the game executable program file $M_3$ (when game executable program file $M_3$ is produced by using Lib file in authorized manner, this stored data corresponds to second authorized protect code $C_2$); a protect code check processing unit 1002 for executing a protect code check procedure when the game executable program is executed; a game execution processing unit 1003 for executing a game in response to a starting instruction issued from the protect code check processing unit 1002; an input data acceptance processing unit 1004 for transferring an input signal supplied from the controller to the game execution processing unit 1003; a sound control processing unit 1005 for producing an audio signal such as sound effect/mood music sound in response to an instruction of the game execution processing unit 10; and also, a picture control processing unit 1006 for producing a video signal of a game screen picture in response to an instruction of the game processing unit 1003. In this case, the protect code check processing unit 1002 includes: a code decrypting process unit 1002a for decrypting both the first protect code $C_1$ and the second protect code $C_2$; a code matching process unit 1002b for checking a matching characteristic of the first and second protect codes $C_1/C_2$ after being decrypted; an ending process unit 1002d for ending the process operations in response to a given ending instruction; and (11) A control processing unit 1002c for supplying either the ending instruction to the ending process unit 1002d or the starting instruction to the game processing unit in response to the check result of the code matching processing unit 1002b.

Figure 11:
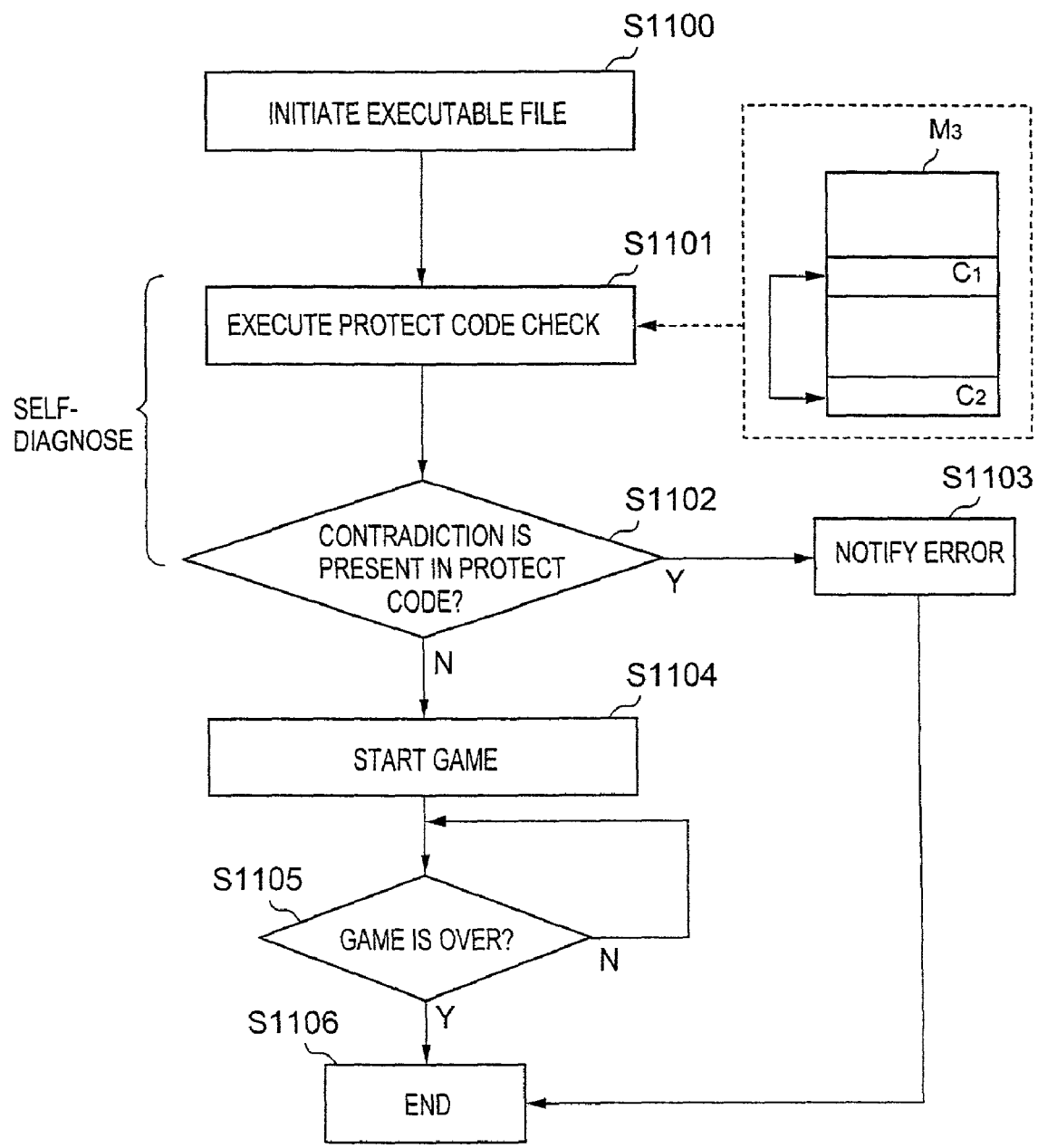
FIG. 11 is a flow chart for describing a process operation of forming the executable program according to the embodiment mode of the present invention.

Next, process operations executed by the above-described functional structural units of the entertainment apparatus 700 will now be described with reference to FIG. 11.

When the game executable program file $M_3$ loaded from the optical disk 900 of FIG. 9 is executed (step S1100), the functional structural unit of FIG. 10 starts the below-mentioned process operations.

In order to decide whether or not the Lib file "$L_2$" assembled in the game executable program file $M_3$ is used in the authorized manner before the game is executed, the below-mentioned self-diagnosing process operation may be carried out by the protect code check processing unit 1002.

First, the control processing unit 1002c instructs the code decrypting processing unit 1002a to decrypt a code. In response to this instruction, the code decrypting processing unit 1002a obtains both data stored in the first protect code storage unit 1000 and data stored in the second protect code storage unit 1001, and then, decrypts these obtained data, respectively.

When the game executable program file $M_3$ is employed which has been generated by using the front-end tool in the authorized manner, such data $C_1$ and $C_2$ which can satisfy the relationship (namely, $C_1=F(C_2)$ in this case) used to generate one set of the first and second protect codes could be accordingly obtained from the decrypting process operation at this time. Therefore, the code matching process unit 1002b decides whether or not the two data $C_1$ and $C_2$ acquired in this case can satisfy this relationship, and then, notifies this diagnostic result to the control process unit 1102c (step S1101).

The control process unit 1102c decides whether or not the Lib file $L_2$ assembled in the game executable program file $M_3$ is used in the authorized manner based upon the diagnostic result of the code matching process unit 1002b (step S1102). Concretely speaking, in the case that such a diagnostic result is notified in which the data $C_1$ and $C_2$ cannot satisfy the relationship utilized to generate one set of the first and second protect codes, this control process unit 1102c decides that the protect codes are invalid. To the contrary, in the case that such a diagnostic result is notified in which the data $C_1$ and $C_2$ can surely satisfy the relationship utilized to generate one set of the first and second protect codes, this control process unit 1102c decides that the protect codes are valid.

In such a case that the control process unit 1102c decides the existence of the invalidity in the protect codes by way of the above-explained self-checking process operation, this control process unit 1102c outputs an error message indicative of this invalidity (step S1003), and then, applies the ending instruction to the ending process unit 1002d. In response to this ending instruction, the ending process unit 1002d executes a predetermined ending process operation so as to end the program (step S1106).

On the other hand, the control process unit 1002d decides on validity of the protect codes, this control process unit 1002d applies a starting instruction to the game execution processing unit 1003. In response to this starting instruction, the game execution processing unit 1003 starts the game process operation (step S1104).

Subsequently, an instruction which is issued from the game player via the controller is transferred from the input data acceptance processing unit 1004 to the game execution processing unit 1003. Then, this game execution processing unit 1003 controls both the sound control processing unit 1005 and the picture control processing unit 1006 so as to change both the picture displayed on the display apparatus and the sound reproduced from the audio apparatus in response to the instruction supplied from the input data acceptance processing unit 1004. While this control operation is carried out, the game execution processing unit 1003 decides whether or not a condition of a game-over is satisfied in a periodic manner (step S1105). When the game execution processing unit 1003 decides that the game-over condition can be satisfied, this game execution processing unit 1003 ends the game (step S1106).

As previously explained, in accordance with the entertainment apparatus of this embodiment mode, the game is executed only in such a case that the authorized protect code is embedded in the read game-executable program file, whereas the game is terminated in such a case that the authorized protect code is not embedded in the read game-executable program file. As a result, if the game-executable program file is not generated by using the front-end tool in the authorized manner, then the game player cannot play the game on this entertainment apparatus. As a consequence, it is possible to prohibit any use except the authorized user of the front-end tool from using the Lib file.

As explained above, as the apparatus used to execute the executable program file which has been generated by performing the above-described executable program file generating process operation, the entertainment apparatus is exemplified. However, such an apparatus used to execute the executable program file which has been generated by performing the above-mentioned executable program file generating process operation is not always limited to the entertainment apparatus. For example, a general-purpose computer capable of having program executable performance may be utilized. Apparent from the foregoing description, as the executable program file, any program files capable of executing process operations other than the game may be employed.

Also, in this embodiment mode the program executing apparatus loads the executable program file from the storage medium. Alternatively, while the executable program file is transmitted via such a transmitting medium as a network, this transmitted executable program file may be stored into the hard disk provided in the program executing apparatus.

Also, in the above-explained embodiment mode, the library file is regarded as an object for protection. Alternatively, other files (any files other than executable file, for instance, a file having image data stored therein) may be regarded as an object to be protected.

While the present invention has been described above in detail, in accordance with the present invention, it is possible to protect against the unauthorized duplication of any files other than the executable file such as a library file.

What is claimed is:

1. An information processing apparatus comprising:
    storage means for storing thereinto an encrypted protective object including a procedure capable of terminating a process operation due to invalidity of a protect code contained in an executable module;
    decrypting means for reading said encrypted protective object from said storage means and decrypting said encrypted protective object;
    code writing means for causing said protect code to be contained in an executable module generated by linking said decrypted protective object with another object; and
    deleting means for deleting said decrypted protective object after said decrypted protective object has been linked with said another object;
    wherein said code writing means adds dummy data to said protect code.

2. An information processing apparatus comprising:
    storage means for storing thereinto an encrypted protective object including a procedure capable of terminating a process operation due to an invalid relationship between a first protect code and a second protect code contained in an executable module;
    decrypting means for reading said encrypted protective object from said storage means and decrypting said encrypted protective object;
    code generating means for generating said first protect code and said second protect code related to said first protect code;
    code writing means for embedding said first protect code into said decrypted protective object, and for embedding said second protect code into said executable module when said executable module is generated by linking with another object said protective object into which said first protect code has been embedded; and
    deleting means for deleting said protective object into which said first protect code has been embedded before said second protect code is embedded;
    wherein said code writing means adds dummy data to both said first protect code and said second protect code.

3. An information processing apparatus as claimed in claim 1 wherein:
    said code generating means generates both said first protect code and said second protect code from a random number.

4. An information processing apparatus as claimed in claim 3, wherein:
    said code writing means adds dummy data to both said first protect code and said second protect code.

5. An information processing apparatus as claimed in claim 1, wherein:
    said code writing means encrypts the protect code to be contained in said executable module; and
    said protective object includes a procedure for decrypting the encrypted protect code contained in said executable module when said protect code is checked.

6. An information processing apparatus as claimed in claim 1, wherein:
    said code writing means encrypts said first protect code and said second protect code both to be contained in said executable module; and
    said protective object includes a procedure for decrypting said encrypted first protect code and said encrypted second protect code contained in said executable module when said first and second protect codes are checked.

7. An information processing apparatus as claimed in claim 3, wherein:
    said code writing means encrypts said first protect code and said second protect code both to be contained in said executable module; and
    said protective object includes a procedure for decrypting said encrypted first protect code and said encrypted second protect code contained in said executable module when said first and second protect codes are checked.

8. An information processing apparatus as claimed in claim 2, wherein:
    said code writing means encrypts said first protect code and said second protect code both to be contained in said executable modide; and
    said protective object includes a procedure for decrypting said encrypted first protect code and said encrypted second protect code contained in said executable module when said first and second protect codes are checked.

9. An information processing apparatus as claimed in claim 4, wherein:
    said code writing means encrypts said first protect code and said second protect code both to be contained in said executable module; and
    said protective object includes a procedure for decrypting said encrypted first protect code and said encrypted second protect code contained in said e ecutable module when said first and second protect codes are checked.

10. A machine readable storage medium stored with a program used for causing an information processing apparatus to execute a process operation, wherein:
    said program causes said information processing apparatus to execute:
    a decrypting process operation for decrypting an encrypted protective object to generate a protective object which contains a procedure for terminating a process operation due to invalidity of a protect code included in an executable module;
    a linking process operation for linking the protective object produced by said decrypting process operation with another object so as to generate said executable module;
    a code writing process operation for containing said protect code into the executable module formed by said coupling process operation; and
    a deleting process operation for deleting said protective object generated by said decrypting process operation after said protective object has been linked with said another object;
    wherein said code writing process operation adds dummy data to said protect code.

11. A machine readable storage medium stored with a program used fbr causing an infonnation processing apparatus to execute a process operation, wherein:

said program causes said information processing apparatus to execute:
a decrypting process operation for decrypting an encrypted protective object to generate a protective object which contains a procedure for terminating a process operation due to an invalid relationship between a first protect code and a second protect code included in an executable module;
a code generating process operation for generating both said first protect code and said second protect code related to said first protect code;
a first code writing process operation for embedding said first protect code into the protective object generated by said decrypting process operation after said decrypting process operation has been executed;
a linking process operation for linking the protective object into which said first protect code is embedded in said first code writing process operation, with another object so as to generate an executable module after said first code writing process operation has been executed;
a second code writing process operation for embedding said second protect code into said executable module generated in said liking process operation after said linking process operation has been executed; and
a deleting process operation for deleting said protective object generated in said decrypting process operation in an interval between said first code writing process and said second code writing process;
wherein said information processing apparatus adds dummy data to both said first protect code and said second protect code.

12. A storage medium as claimed in claim 11, wherein:
said program causes said information processing apparatus to generate both said first protect code and said second protect code from a random number in said code generating process operation.

13. A storage medium as claimed in claim 11, wherein:
said program causes said information processing apparatus to add dummy data to both said first protect code and said second protect code.

14. A storage medium as claimed in claim 10, wherein:
said program causes said information processing apparatus to execate a process operation for encrypting said protect code to be incorporated into said executable module; and
said protective object includes a procedure for decrypting said encrypted protect code contained in said executable module when said protect code is checked.

15. A storage medium as claimed in claim 11, wherein:
said program causes said information processing apparatus to execute a process operation for encrypting said first and second protect codes to be incorporated into said executable module; and
said protective object includes a procedure for decrypting said encrypted first protect code and said encrypted second protect code contained in said executable module when said first and secoud protect code are checked.

16. A storage medium as claimed in claim 11, wherein:
said program causes said information processing apparatus to execute a process operation for encrypting said first and second protect codes to be incorporated into said executable module; and
said protective object includes a procedure for decrypting said encrypted first protect code and said encrypted second protect code contained in said executable module when said first and second protect code are checked.

17. A storage medium as claimed in claim 11, wherein:
said program causes said infonnation processing apparatus to execute a process operation for encrypting said first and second protect codes to be incorporated into said executable module; and
said protective object includes a procedure for decrypting said encrypted first protect code and said encrypted second protect code contained in said executable module when said first and second protect code are checked.

18. A storage medium as claimed in claim 13, wherein:
said program causes said information processing apparatus to execute a process operation for encrypting said first and second protect codes to be incorporated into said executable module; and
said protective object includes a procedure for decrypting said encrypted first protect code and said encrypted second protect code contained in said executable module when said first and second protect code are checked.

19. A machine readable storage medium stored with an object to be processed by an information processing apparatus including a computer processor, wherein:
an encrypted protective object is stored into said storage medium;
said encrypted protective object contains a procedure capable of terminating a process operation of the computer processor when there is invalidity in one or more protect codes contained in an executable module with said protective object incorporated therein;
said encrypted protective object is read from said storage medium and decrypted;
said executable module is generated by linking said decrypted protective object with another object;
said decrypted protective object is deleted after said decrypted protective object has been linked with said another object; and
said one or more protect codes include dummy data.

20. A storage medium as claimed in claim 19, wherein:
in the case that the protect code contained in said executable module is encrypted, said protective object includes a procedure capable of decrypting said encrypted protect code prior to a checking operation of said protect code.

21. A method of generating an executable module, which causes an information processing apparatus to generate said executable module by linking a plurality of objects with each other, comprising the steps of:
generating, by decrypting an encrypted protective object, a protective object containing a procedure for terminating a process operation due to invalidity of a protect code included in an executable module;
generating said executable module by linking said decrypted protective object with other object and writing said protect code; and
deleting said decrypted protective object after linking with said other object;
wherein said proteet code includes dummy data.

22. A method of generating an executable module, which causes an information processing apparatus to produce said executable module by linking a plurality of objects with each other, comprising the steps of:
generating, by decrypting an encrypted protective object, a protective object containing a procedure for terminating a process operation due to an invalid relationship between a first protect code and a second protect code included in said executable module;

generating said first and second protect codes;
embedding said first protect code into said decrypted protective object;
generating said executable module by linking with other object said first-protect-code-embedded protective object;
embedding said second protect code into said executable module; and
deleting said first-protect-code-embedded protective object before embedding of said second protective code;
wherein said first protect code and said second protect code include dummy data.

23. A machine readable storage medium stored with an executable module, said executable module being executed by an apparatus including a computer processor capable of executing an executable module assembled by linking a plurality of objects with each other, wherein:
said plurality of objects each contain a library object, and said library object contains a procedure capable of checking whether or not there is invalidity in at least one protect code and also of terminating a process operation of said executable module in the computer processor in response to said checking result;
said executable module has at least one protect code embedded thereinto;
said executable module is generated by linking a decrypted protective object with another object; and
said decrypted protective object is deleted after said decrypted protective object has been linked with said another object;
wherein said at least one protect code includes dummy data.

24. An entertainment apparatus for executing an executable module generated by linking a plurality of objects with each other, one of the plurality of objects linked being a decrypted protective object, a first protect code being contained in one of said plural objects and a second protect code being contained in said executable module, the entertainment apparatus comprising:
means for checking a relationship therebetween;
means for terminating a process operation of said executable module when said relationship is invalid; and
means for deleting said decrypted protective object alter said decrypted protective object has been linked with another one of said plural objects;
wherein said first protect code and said second protect code include dummy data.

25. A program product containing a program used to cause an information processing apparatus to execute a process operation, wherein;
said program causes said information processing apparatus to execute:
a decrypting process operation for decrypting an encrypted protective object to generate a protective object which contains a procedure for terminating a process operation due to invalidity of a protect code included in an executable module;
a linking process operation for linking the protective object generated by said decrypting process operation with another object so as to generate said executable module;
a code writing process operation for incorporating said protect code into the executable module generated by said linking process operation; and a deleting process operation for deleting said protective object generated by said decrypting process operation after said protective object has been linked with said another object;
wherein said code writing process operation adds dummy data to said protect code.

26. A program product containing a program used to cause an information processing apparatus to execute a process operation, wherein:
said program causes said information processing apparatus to execute:
a decrypting proccss operation for decrypting an encrypted protective object to generate a protective object which contains a procedure for terminating a process operation due to an invalid relationship among a plurality of protect codes included in an executable module;
a code generating process operation for generating both a first protect code and a second protect code related to said first protect code;
a first code writing process operation for embedding said first protect code into the protective object generated by said decrypting process operation after said decrypting process operation has been executed;
a linking process operation for linking with another object the protective object into which said first protect code is embedded in said first code writing process operation so as to generate an execution module after said first code writing process operation has been executed;
a second code writing process operation for embedding said second protect code into said executable module generated in said linking process operation after said linking process operation has been executed;
a deleting process operation for deleting said protective object generated in said decrypting process operation in an interval betwcen said first code writing process operation and said second code writing process operation;
said information processing apparatus adds dummy data to both said first protect code and said second protect code.

27. A program product as claimed in claim 26, wherein:
said program causes said information processing apparatus to generate both said first protect code and said second protect code from a random number in said code gcnerating process operation.

28. A program product as claimed in claim 25, wherein:
said program causes said information processing apparatus to execute a process operation for encrypting said protect code used to be contained in said executable module; and
said protective object includes a procedure for decrypting the encrypted protect code contained in said cxecutable module when said protect code is checked.

29. A program product as claimed in claim 26, wherein:
said program causes said infonnation processing apparatus to execute a process operation for encrypting said first protect code and said second protect code to be incorporated into said executable module; and
said protective object includes a procedure for decrypting the encrypted protect code contained in said executable module when said first and second protect codes are checked.

30. A program product as claimed in claim 27, wherein:
said program causes said information processing apparatus to execute a process operation for encrypting said first protect code and said second protect code to be incorporated into said executable module; and said protective object includes a procedure for decrypting the encrypted protect code contained in said executable module when said first and second protect codes are checked.

31. A program product as claimed in claim 26, wherein:
said program causes said information processing apparatus to execute a process operation for encrypting said first protect code and said second protect code to be incorporated into said executable module; and
said protective object includes a procedure for decrypting the encrypted protect code contained in said executable module when said first and second protect codes are checked.

32. A program product as claimed in claim 27, wherein:
said program causes said information processing apparatus to execute a process operation for encrypting said first protect code and said second protect code to be incorporated into said executable module; and
said protective object includes a procedure for decrypting the encrypted protect code contained in said executable module when said first and second protect codes are checked.

33. A computer-readable recording medium having recorded thereon a software product containing an object to be generated by an information processing apparatus including a computer processor, comprising:
an encrypted protective object including a procedure capable of terminating a process operation of the computer processor when there is invalidity of a protect code which is contained in an executable module with said software product incorporated thereinto;
wherein said encrypted protective object is decrypted;
wherein said executable module is generated by linking said decrypted protective object with another object; and wherein said decrypted protective object is deleted after said decrypted protective object has been linked with said another object;
wherein said protect code includes dummy data.

34. A computer-readable recording medium having recorded thereon a software product as claimed in claim 33, wherein:
in the case that the protect code contained in said executable module is encrypted, said software product includes a procedure capable of decrypting said encrypted protect code prior to checking whether or not there is invalidity of said protected code.

35. A computer-readable recording medium having recorded thereon a software product containing an executable module, which is executed by an apparatus including a computer processor capable of executing an executable module assembled by linking a plurality of objects with each other, one of the plurality of objects linked being a decrypted protective object, wherein:
said executable module has at least one protect code embedded therein;
said plurality of objects each include a library object which contains a procedure for checking whether or not there is invalidity of the protect code contained in said executable module, and for terminating a process operation of said executable module in the computer processor in response to the checking result; and
said decrypted protective object is deleted after said decrypted protective object has been linked with another one of said plurality of objects;
wherein said at least one protect code includes dummy data.

* * * * *